United States Patent [19]
Probst et al.

[11] Patent Number: 5,932,304
[45] Date of Patent: Aug. 3, 1999

[54] BARRIER LAYER COMPOSITION FOR POLYOLEFIN BODIES

[75] Inventors: Werner Probst, Bad Soden-Salmünster; Peter Knobloch, Tegernheim; Christoph Roth, Halle; Hans-Jürgen Müller, Sandersdorf; Frank Apsel, Bad Dürrenberg, all of Germany

[73] Assignees: Plastic Omnium GmbH, Karben; FEW Forschungs- und Entwicklungsgesellschaft Wolfen mbH, Wolfen, both of Germany

[21] Appl. No.: 08/892,082

[22] Filed: Jul. 14, 1997

[30] Foreign Application Priority Data

Jul. 15, 1996 [DE] Germany .................... 196 28 481

[51] Int. Cl.⁶ .................... B29D 22/00; B32B 27/38; B32B 9/04; C08F 8/00
[52] U.S. Cl. .................... 428/35.4; 428/35.7; 428/36.6; 428/413; 428/447; 428/451; 428/480; 428/518; 428/520; 525/100; 525/102; 525/103; 525/207; 524/114; 524/262; 524/588
[58] Field of Search ................ 428/35.4, 35.7, 428/36.6, 413, 447, 451, 480, 518, 520; 427/410; 525/207, 100, 102, 103; 524/114, 262, 588; 106/287.13, 287.16, 287.18, 287.19

[56] References Cited

U.S. PATENT DOCUMENTS

| | | | |
|---|---|---|---|
| Re. 32,272 | 10/1986 | Funaki et al. | 524/114 |
| 4,522,966 | 6/1985 | Funaki et al. | 524/114 |
| 4,594,379 | 6/1986 | Funaki et al. | 524/114 |
| 4,642,266 | 2/1987 | Funaki et al. | 428/412 |
| 5,206,295 | 4/1993 | Harper et al. | 525/207 |

FOREIGN PATENT DOCUMENTS

3121646C2  5/1995  Germany .

*Primary Examiner*—Ellis Robinson
*Assistant Examiner*—Jennifer M. Hayes
*Attorney, Agent, or Firm*—Townsend and Townsend and Crew LLP

[57] ABSTRACT

The present invention refers to a barrier layer composition which is to be applied to at least one surface of a polyolefin body, in particular a polyolefin hollow body, wherein the composition contains: a) 40–70% by weight of one or more epoxide-containing metal oxide sols; b) 25–55% by weight of a binding agent polymer consisting of a terpolymer of maleic acid-maleic anhydride-vinyl monomers and/or a copolymer of maleic acid-vinyl monomers having a composition by mole of 50–75% of a vinyl monomer, 5–50% of maleic acid, and 0–20% of maleic anhydride; and c) 0.1–5% by weight of a catalyst on the basis of one or more tertiary amines.

The hollow bodies coated with the barrier layer can be used particularly as storage containers for organic substances, in particular for organic solvents, fuels, mineral oils, pesticides, and other substances, for example liquids, the diffusion of which is to be inhibited or at least essentially reduced.

12 Claims, No Drawings

BARRIER LAYER COMPOSITION FOR POLYOLEFIN BODIES

The present invention relates to a barrier layer composition polyolefin bodies, particularly for polyolefin hollow bodies, wherein said barrier layer at least significantly reduces the penetration of volatile hydrocarbons and aromatics such as mineral oils, petrol, or pesticides.

Because of their excellent chemical resistance, their good mechanical properties as well as the plurality of shaping possibilities, hollow bodies and especially those made of high-density polyethylene are widely used as storage containers for hydrocarbons, such as petrol or mineral oils.

A disadvantage in the use as fuel tanks for cars has been a certain leakiness of polyethylene for fuels. Many suggestions have been made regarding the reduction of this disadvantageous diffusion out of the plastic hollow bodies. These suggestions comprise for example a) creation of laminate structures made of polyamides; b) surface modification c) application of a barrier layer by varnishing.

Large volume, blow-molded hollow bodies having laminate structures are very costly and fail to comply with all the test requirements for fuel tanks. In the case of fuel tanks, processes which reduce the permeation by means of surface modification have gained general acceptance. Examples for these processes are the sulfonation (DE 1,953,371, U.S. Pat. No. 3,740,258), the fluorination (JP 61,230,919, Plast. Eng. (1978) 34, p. 40, Gas Aktuell (1993) 45, p. 9) as well as the treatment of microwave plasma in the form of a plasma polymerization (DE 4,318,086, EP 302,457).

Further, a process is known for the deposition of $SiO_x$ layers having a barrier effect by decomposition in plasma consisting of organic silicon compounds (Vak. Prax. (1991) 3, p. 22).

JP 62,130,823 describes the application of metallic layers by thermal decomposition of carbonyls based on iron, nickel, or chromium. This process, however, requires a very high technological effort and has a very detrimental effect on production costs.

EP 558,886 and EP 551,819 suggest to treat, after a plasma treatment, the inner surfaces of hollow bodies with isocyanates which are able to form cross-links following moisture access. This process is disadvantageous inasmuch as it requires the use of highly toxic compounds as well as is difficult to carry out in view of the production technique.

Further, it is known to suppress the permeation by application of layers of varnish. As a binding agent for varnishes, there have been preferably used polyepoxides in combination with plasticizing polyurethanes (DE 3,447,022). In addition, also in combination with sulfonation there are known urea-formaldehyde resins, melamine-formaldehyde resins (UK 2,069,870), or epoxy resins (JP 5,555,938). These processes however, require extensive pretreatment with aggressive gases and provide an insufficient reduction of the permeation.

Therefore, it is an object of the present invention to create a barrier layer composition which does not require a pretreatment in the form of a sulfonation or a fluorination and which contains non-toxic binding agents for varnish.

According to the invention, this object is solved by the barrier layer composition characterized in more detail in claim 1. This barrier layer composition can be applied to polyolefin bodies, especially to polyolefin hollow bodies, to which it is applied to at least one surface thereof. According to the invention, the invention also comprises other fields of application, including for example the application of a barrier layer to the fenders of cars.

Other advantages of this barrier composition are its good adhesion to polyolefins as well as its capability to effectively reduce the permeation. The barrier layer is applied to at least one surface of hollow bodies made of polyolefins. Preferably, the polyolefin is a polyethylene. The barrier layer reduces the permeation of organic substances, for example organic solvents, volatile hydrocarbons and aromatics, for example of petrol and mineral oils, of pesticides, cosmetics, etc., being materials, and especially liquids, whose diffusion is to be inhibited. In one embodiment of the invention, the hollow body is a fuel tank for cars.

Thus, according to the invention, there is applied to at least one surface of a polyolefin body, in particular polyolefin hollow body a composition being effective as an additional barrier layer, for example by varnishing, wherein this layer substantially consists of the following components:

a) 40–70% by weight of one of more epoxide-containing metal oxide sols b) 25–55% by weight of a binding agent polymer consisting of a terpolymer of maleic acid-maleic anhydride-vinyl monomers and/or a copolymer of maleic acid-vinyl monomer having a composition by mole of 50–75% of vinyl monomers, 5–50% of maleic acid, and 0–20% of maleic anhydride; and 0.1–5% by weight of a catalyst on the basis of one or more tertiary amines.

The epoxide-containing metal oxide sol is based on glycidylalkoxysilanes.

In one embodiment of the invention, the barrier layer composition additionally contains 0.1–25% by weight, based on the total composition, of additives, which do not or only insignificantly affect the function of the barrier layer. In preferred embodiments of the invention, the additives are present in an amount of 3–20% by weight or 5–15% by weight, respectively, based on the total composition. The additives preferably are coloring agents or color pigments. According to the invention, also filling agents may be used inasmuch as they do not or only insignificantly influence the effect of the barrier layer.

The binding agent polymers used according to the invention may for practical simplicity be prepared by radical polymerization of maleic anhydride and vinyl monomers using ketones as a solvent. The respective copolymers or terpolymers may then easily be prepared by hydrolysis.

As vinyl monomers, there may be used for example styrene, alkylstyrene, vinylester, vinylether, for example methylvinylether, acrylic or methacrylic esters. The molecular weight of the binding agent polymer preferably is about 5,000 to about 500,000 D.

The metal oxide sols according to the invention may be prepared in a known manner, for example by acid hydrolysis of glycidyl silane in water/solvent mixtures, for example as described in J. of Non.Crystalline Solids, 81 (1986) 365. Preferably, mixtures of acetone and water are used as solvents in the hydrolysis.

Examples for the glycidyl silanes which may be used according to the invention are glycidyloxypropyl triethoxysilane or glycidyloxypropyl trimethoxysilane.

Further, besides silicon the metal oxide sols may also contain aluminium or titanium in the form of an oxide in which case the glycidyl silanes are hydrolized in the presence of aluminium alkoxides or titanium alkoxides. Examples for those mixed oxide sols are mixtures of 60 parts by weight of tetraethoxysilane 25 parts by weight of glycidyloxypropyl triethoxysilane 15 parts by weight of aluminium triisobutylate 50 parts by weight of tetraethoxysilane 25 parts by weight of glycidyloxypropyl trimethoxysilane 25 parts by weight of 2-ethylhexyl titanate As catalysts for the coating mass, all of the tertiary amines known can be employed as they are conventionally used for the cross-linking of epoxy resins. Examples for these catalysts are triethylamine, tributylamine or DABCO® (1,4-diazabicyclo[2.2.2]octane). The concentration is 0.1 to 5% by weight, based on total solid content of the solution.

As a solvent for the coating, there are preferably used ketones, for example acetone or methylethylketone.

The polyolefin bodies, preferably hollow bodies, to be coated may consist of polyethylene, polypropylene, mixtures of these with other polymers as well as copolymers. Further preferred are polyolefin bodies made of poly (ethylene-terephthalate) (PET). The polyolefin bodies can be produced for instance by blowing or injection molding.

The composition according to the invention will be applied to the polyolefin hollow body from the outer surface (in advantageous manner inside or outside of the plastic bulb) with the application being supported by heat and other types of treatment, and also by plasma coating. Promotive effects will be achieved by an improvement of the spraying method or the immersion method and of the subsequent drying.

From the above it becomes clear that a process of this type may also be used with plastic containers containing pesticides or food since the barrier layers according to the invention are able to contain not only the fuel itself or solvents but also aromatics or aromatic compounds etc. with regard to their tendency to permeate. Surprisingly, by means of the barrier layer composition of the invention it is possible to combine the epoxide-containing metal oxide sols with polyolefins and to concomitantly achieve an acceptable adhesion and low brittleness.

By admixture of pigment dyes, for example in a proportion of 10–20% by weight, based on the total composition, the plastic hollow bodies coated by the composition of the invention may not only receive a decorative layer (color) but by this may also be further improved with respect to their properties, for example in the use as fenders, cosmetic bottles etc. made of polyolefins.

The coating may be carried out by known coating procedures such as spray painting or immersion painting, preferably choosing a thickness of the barrier layer of 5 to 20 µm.

Prior to coating, it is advantageous to carry out a surface pretreatment to improve the adhesion, such as for example flame or corona treatment, or otherwise in the case of shape-retaining bodies to use the residual heat from the blowing process for coating. Hollow bodies leaving the blowing apparatus frequently have a residual heat of more than 65° C. and are typically cooled in cooling molds. This residual heat of the naked plastic bulb can preferably be used for the coating of the barrier layer. In some cases, however, cooling prior to coating is neccessary to ensure the precision of shape of the hollow body.

Polymeric layers only consisting of maleic acid copolymers or terpolymers show a very low barrier effect and unsatisfactory adhesion to polyolefins. Also, by addition of known cross-linking agents such as polyols, polyamines, or diepoxides this adhesion cannot be substantially improved. Further, metal oxide layers applied in the form of sols are unsuitable for barrier layers since they are brittle and also show only little barrier effect. It was not before the combination of the invention that surprisingly the desired barrier effect has been achieved.

Barrier layers effected by the composition of the invention are superior because of their good adhesion to the hollow bodies coated by them. Application of the barrier layer can be performed in economical manner by known varnishing techniques. A further advantage is the lower toxicity of the components which require no cost-intensive precautionary measures for handling.

The hollow bodies coated by the barrier layer according to the invention are suitable as storage containers for organic substances, in particular for hydrocarbons and mineral oils, pesticides, cosmetics and other substances, for example liquids, the diffusion of which is to be inhibited or at least essentially reduced. The hollow bodies coated by the barrier layer according to the invention are employed for example as fuel tanks in cars.

In the following, the invention will be detailed with respect to examples and to a comparative example.

EXAMPLE 1 Comparative Example

A 0.5 liter bottle made of polyethylene (Lupolene® 4261) having a wall thickness of 0.5 mm is treated by immersion varnishing with the following coating solution: 500 ml methylethylketon 40 g bisphenol A diglycidyether 9.6 g isophoronediamine The coating is air-dried for 30 minutes and then dried at 80° C. A thickness of the dry layer of 4.1 µm is obtained. The coated bottle is filled with 250 ml of petrol and is provided with a Teflon® seal. The loss of petrol caused by permeation through the vessel wall at room temperature is determined by weighing after 21 days. An uncoated bottle is used for comparison. The barrier effect of the barrier layer (BE in %) results from the following equation $$BE\,(\%) = 100 - \frac{C_1}{C_2} \cdot 100$$

$C_1$=weight loss of coated sample $C_2$=weight loss of uncoated sample

A value of 41% is obtained.

EXAMPLES

EXAMPLE 2

In an analogous way to example 1 a coating is applied to flame-treated bottle having the following composition in solution:

| | |
|---|---|
| 100 ml | acetone |
| 140 ml | methylethylketone |
| 262 ml | metal oxide sol (10% in acetone) on the basis of glycidyloxypropyl triethoxysilane |
| 11.25 g | maleic acid-maleic anhydride-styrene terpolymer, molecular composition 40:10:50, average molecular weight of 90,000 D |
| 1.4 g | triethylamine |

A barrier effect of 82% is obtained.

EXAMPLE 3

In analogous manner to example 2 a coating is effected having the following composition in solution:

| | |
|---|---|
| 200 ml | acetone |
| 130 ml | methylethylketone |
| 170 ml | metal oxide sol (10% in acetone) on the basis of glycidyloxypropyl trimethoxysilane |
| 20.5 g | maleic acid-styrene copolymer, molecular composition 50:50, average molecular weight of 128,000 D |
| 1.0 g | triethylamine |

A barrier effect of 88% is obtained.

EXAMPLE 4

In analogous manner to example 2 a coating is effected having the following composition in solution:

| | |
|---|---|
| 150 ml | acetone |
| 110 ml | methylethylketone |
| 240 ml | metal oxide sol (10% in acetone) on the basis of 50% by weight tetraethoxysilane 25% by weight 2-ethyl hexyltitanate 25% by weight glycidyloxypropyl triethoxysilane |
| 18.5 g | maleic acid-styrene copolymer, molecular composition 50:50, average molecular weight of 60,000 D |
| 1.2 g | triethylamine |

A barrier effect of 85% is obtained.

EXAMPLE 5

In analogous manner to example 2 a coating is effected having the following composition in solution:

| | |
|---|---|
| 180 ml | acetone |
| 130 ml | methylethylketone |
| 187 ml | metal oxide sol (10% in acetone) on the basis of glycidyloxypropyl trimethoxysilane |
| 18.6 g | vinylmethylether-maleic acid copolymer, molecular composition 50:50, average molecular weight of 82,000 D |
| 1.4 g | triethylamine |

A barrier effect of 89% is obtained.

We claim:

1. A barrier layer coated polyolefin hollow body coated with a barrier layer composition for reducing diffusion of organic substances, characterized in that said barrier layer composition essentially contains:
   a) 40–70% by weight of one or more epoxide-containing metal oxide sols;
   b) 25–55% by weight of a binding agent polymer selected from the group consisting of a terpolymer of maleic acid-maleic anhydride-vinyl monomers and a copolymer of maleic acid-vinyl monomers having a composition by mole of 50–75% of a vinyl monomer, 5–50% of maleic acid, and 0–20% of maleic anhydride; and
   c) 0.1–5% by weight of a catalyst based on one or more tertiary amines;
   wherein said epoxide containing metal sols are glycidylalkoxysilanes treated by acid hydrolysis to form a mixed hydrolysate of glycidylsilane together with titanium or aluminum alkoxides.

2. Barrier layer composition according to claim 1, characterized in that said barrier layer composition essentially contains the following components:
   a) 45–65% by weight of one or more epoxide-containing metal oxide sols
   b) 30–50% by weight of a binding agent polymer selected from the group of a terpolymer of maleic acid-maleic anhydride-vinyl monomers or copolymer of maleic acid-vinyl monomers having a composition by mole of 50–75% of a vinyl monomer, 5–50% of maleic acid, and 0–20% of maleic anhydride; and
   c) 2–5% by weight of a catalyst on the basis of one or more tertiary amines.

3. Barrier layer composition according to claim 1, characterized in that said barrier layer composition essentially contains the following components:
   a) 45–55% by weight of one or more epoxide-containing metal oxide sols
   b) 40–50% by weight of a binding agent polymer consisting of a terpolymer of maleic acid-maleic anhydride-vinyl monomers or a copolymer of maleic acid-vinyl monomers having a composition by mole of 50–75% of a vinyl monomer, 5–50% of maleic acid, and 0–20% of maleic anhydride; and
   c) 3–5% by weight of a catalyst on the basis of one or more tertiary amines.

4. Barrier layer composition according to claim 1, characterized in that said terpolymer or copolymer contains methylvinylether, styrene or a combination thereof as said vinyl monomer.

5. Barrier layer composition according to claim 1, characterized in that said metal oxide sol is a mixed oxide sol of tetraethoxysilane, glycidyloxypropyl triethoxysilane, and aluminium triisobutylate, or of tetraethoxysilane, glycidyloxypropyl trimethoxysilane, and 2-ethyl hexyltitanate.

6. Barrier layer composition according to claim 1, characterized in that said catalyst is a cross-linking catalyst, selected from the group, consisting of triethylamine, tributylamine or DABCO®.

7. Barrier layer composition according to claim 1, characterized in that said barrier layer composition additionally contains 0.1–25% by weight, based on the total composition, of additives which are compatible with the barrier layer composition.

8. Barrier layer composition according to claim 7, characterized in that said additives are present in an amount of 3–20% by weight, based on the total composition.

9. Barrier layer composition according to claim 8, characterized in that said additives are present in an amount of 5–15% by weight, based on the total composition.

10. Barrier composition according to claims 7, 8 or 9, characterized in that said additives are coloring agents.

11. A polyolefin hollow body characterized in that said hollow body has at least one coating by a barrier layer composition according to claim 1.

12. A polyolefin hollow body according to claim 11, characterized in that said polyolefin hollow body is selected from the group consisting of polyethylene, polypropylene or PET.

* * * * *